United States Patent [19]
Ashford

[11] Patent Number: 5,909,172
[45] Date of Patent: Jun. 1, 1999

[54] AUTO LIGHT SENSOR SYSTEM

[76] Inventor: Steven Ashford, 1 Camping Close, Sawston Cambridge, United Kingdom, CB2 4HP

[21] Appl. No.: 08/906,114

[22] Filed: Jul. 25, 1997

[51] Int. Cl.⁶ .................................................. B60Q 11/00
[52] U.S. Cl. ........................ 340/458; 340/459; 340/469; 340/457.2; 307/10.8; 315/82
[58] Field of Search ...................................... 340/458, 459, 340/469, 457.2, 309.4, 815.75, 815.76, 815.77, 942; 315/82, 159; 307/10.8; 313/531

[56] References Cited

U.S. PATENT DOCUMENTS

| | | | |
|---|---|---|---|
| 4,443,057 | 4/1984 | Bauer et al. | 350/281 |
| 4,665,321 | 5/1987 | Chang et al. | 307/10 LS |
| 4,896,075 | 1/1990 | Earle | 315/82 |
| 5,349,267 | 9/1994 | Brassier et al. | 315/82 |
| 5,483,107 | 1/1996 | Xander | 307/10.8 |
| 5,736,816 | 4/1998 | Strenke et al. | 315/82 |

FOREIGN PATENT DOCUMENTS

24985/88  2/1989  Australia .

*Primary Examiner*—Daniel J. Wu
*Assistant Examiner*—Toan N. Pham

[57] ABSTRACT

A new Auto Light Sensor System for automatically controlling a vehicle's parking lights and headlights according to light conditions outside of the vehicle. The inventive device includes a first light sensor secured to the vehicle and electrically connected to the parking lights, and a second light sensor secured to the vehicle and electrically connected to the headlights.

9 Claims, 3 Drawing Sheets

AUTO LIGHT SENSOR SYSTEM

BACKGROUND OF THE INVENTION

1. Field of the Invention

The present invention relates to Vehicle Lighting Devices and more particularly pertains to a new Auto Light Sensor System for automatically controlling a vehicle's parking lights and headlights according to light conditions outside of the vehicle.

2. Description of the Prior Art

The use of Vehicle Lighting Devices is known in the prior art. More specifically, Vehicle Lighting Devices heretofore devised and utilized are known to consist basically of familiar, expected and obvious structural configurations, notwithstanding the myriad of designs encompassed by the crowded prior art which have been developed for the fulfillnent of countless objectives and requirements.

Known prior art Vehicle Lighting Devices include U.S. Pat. No. 5,424,585; U.S. Pat. No. 4,971,405; U.S. Pat. No. 4,629,941; U.S. Pat. No. Des. 287,408; U.S. Pat. No. 4,236,099; and U.S. Pat. No. 5,453,662.

While these devices fulfill their respective, particular objectives and requirements, the aforementioned patents do not disclose a new Auto Light Sensor System. The inventive device includes a first light sensor secured to the vehicle and electrically connected to the parking lights, and a second light sensor secured to the vehicle and electrically connected to the headlights.

In these respects, the Auto Light Sensor System according to the present invention substantially departs from the conventional concepts and designs of the prior art, and in so doing provides an apparatus primarily developed for the purpose of automatically controlling a vehicle's parking lights and headlights according to light conditions outside of the vehicle.

SUMMARY OF THE INVENTION

In view of the foregoing disadvantages inherent in the known types of Vehicle Lighting Devices now present in the prior art, the present invention provides a new Auto Light Sensor System construction wherein the same can be utilized for automatically controlling a vehicle's parking lights and headlights according to light conditions outside of the vehicle.

The general purpose of the present invention, which will be described subsequently in greater detail, is to provide a new Auto Light Sensor System apparatus and method which has many of the advantages of the Vehicle Lighting Devices mentioned heretofore and many novel features that result in a new Auto Light Sensor System which is not anticipated, rendered obvious, suggested, or even implied by any of the prior art Vehicle Lighting Devices, either alone or in any combination thereof.

To attain this, the present invention generally comprises a first light sensor secured to the vehicle and electrically connected to the parking lights, and a second light sensor secured to the vehicle and electrically connected to the headlights.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Auto Light Sensor System apparatus and method which has many of the advantages of the Vehicle Lighting Devices mentioned heretofore and many novel features that result in a new Auto Light Sensor System which is not anticipated, rendered obvious, suggested, or even implied by any of the prior art Vehicle Lighting Devices, either alone or in any combination thereof.

It is another object of the present invention to provide a new Auto Light Sensor System which may be easily and efficiently manufactured and marketed.

It is a further object of the present invention to provide a new Auto Light Sensor System which is of a durable and reliable construction.

An even further object of the present invention is to provide a new Auto Light Sensor System which is susceptible of a low cost of manufacture with regard to both materials and labor, and which accordingly is then susceptible of low prices of sale to the consuming public, thereby making such Auto Light Sensor System economically available to the buying public.

Still yet another object of the present invention is to provide a new Auto Light Sensor System which provides in the apparatuses and methods of the prior art some of the advantages thereof, while simultaneously overcoming some of the disadvantages normally associated therewith.

Still another object of the present invention is to provide a new Auto Light Sensor System for automatically controlling a vehicle's parking lights and headlights according to light conditions outside of the vehicle.

Yet another object of the present invention is to provide a new Auto Light Sensor System which includes a first light sensor secured to the vehicle and electrically connected to the parking lights, and a second light sensor secured to the vehicle and electrically connected to the headlights.

Still yet another object of the present invention is to provide a new Auto Light Sensor System that operates only when the vehicle is running.

Yet another object of the present invention is to provide a new Auto Light Sensor System that has several sensors fitted, on different areas on the vehicle, so that temporary bright light sources does not cause inconsistent operation of the present invention.

Another object of the present invention is to provide a new Auto Light Sensor System that includes side lights which come during twilight hours.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
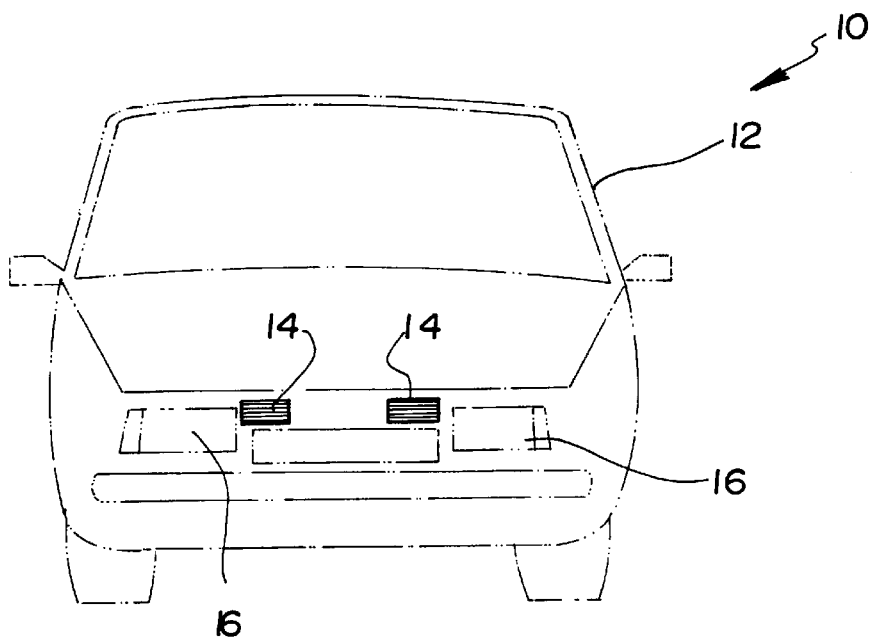
FIG. 1 is a front view of a new Auto Light Sensor System according to the present invention.
Figure 2:
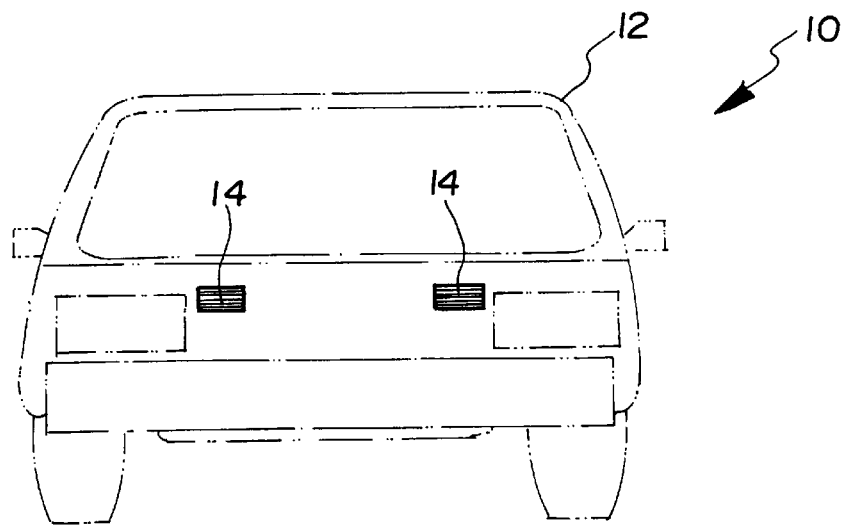
FIG. 2 is a rear view of the present invention.

With reference now to the drawings, and in particular to FIGS. 1 through 6 thereof, a new Auto Light Sensor System embodying the principles and concepts of the present invention and generally designated by the reference numeral 10 will be described.

As best illustrated in FIGS. 1 through 6, the Auto Light Sensor System 10 comprises a light detecting means 20 electrically connected to the parking lights 14 and electrically connected to the headlights 16. The light detecting means 20 activates the parking lights 14 only upon detecting slight to complete darkness and wherein tile light detecting means 20 activates the headlights 16 upon detecting near darkness outside of the vehicle 12.

Figure 3:
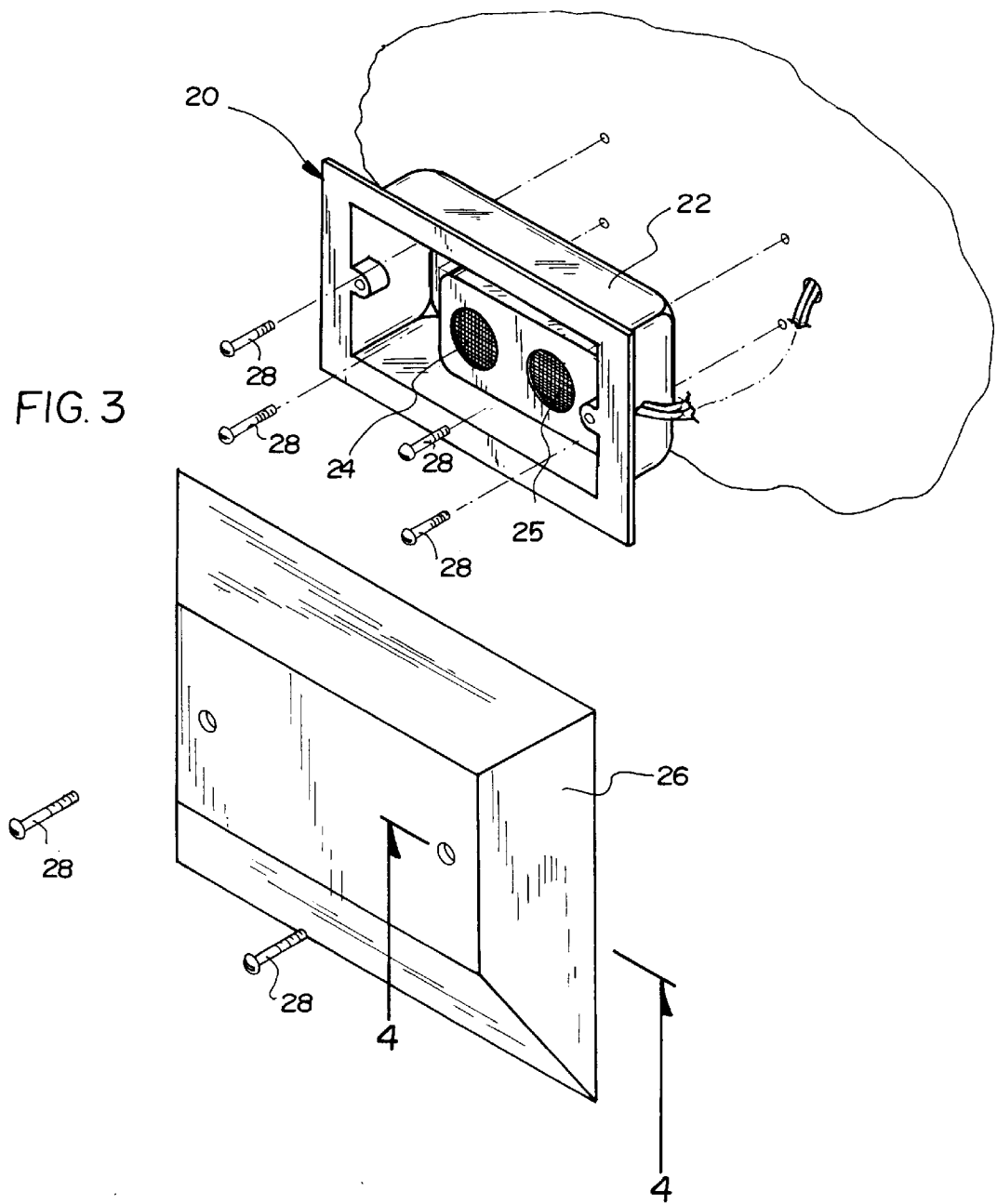
FIG. 3 is an exploded upper perspective view of the light detecting means.
Figure 4:
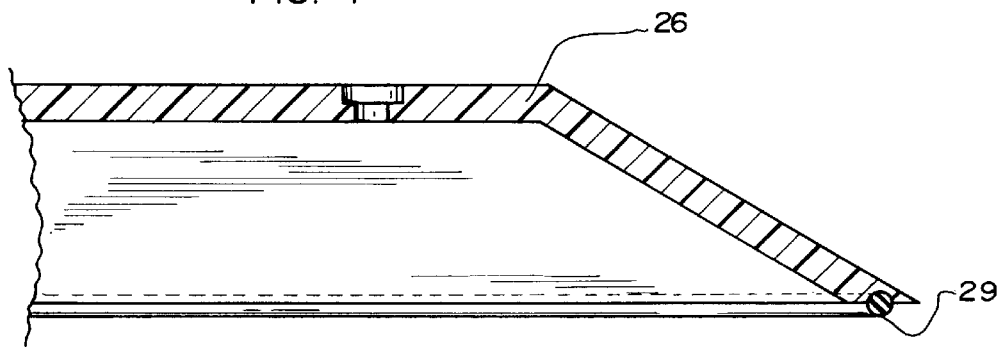
FIG. 4 is a cross sectional view taken along line 4—4 of FIG. 3.
Figure 5:
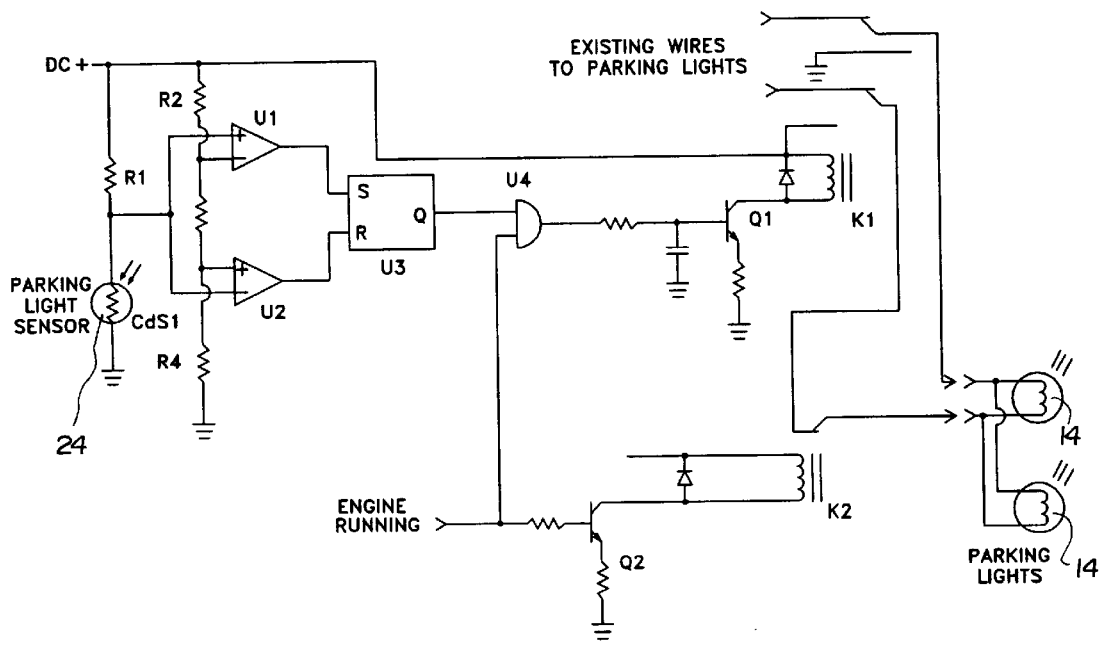
FIG. 5 is a schematic illustration of conventional circuitry for controlling the parking lights.
Figure 6:
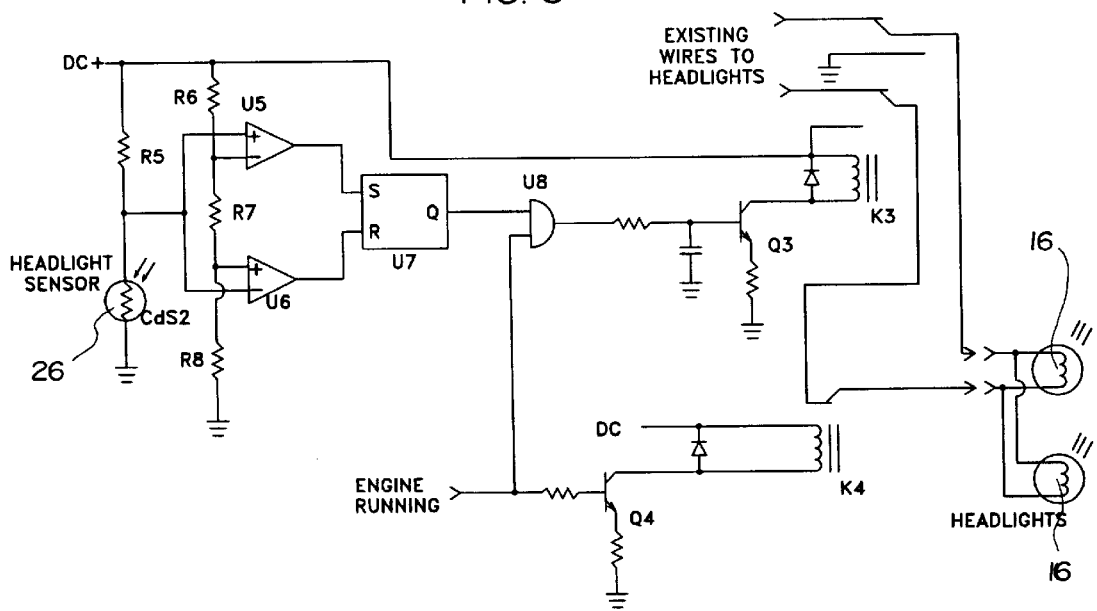
FIG. 6 is a schematic illustration of conventional circuitry for controlling the headlights.

As shown in FIGS. 3 and 4, the light detecting means 20 comprises a first light sensor 24 electrically connected to the parking lights 14. The first light sensor 24 activates the parking lights 14 only upon detecting slight to complete darkness. A second light sensor 25 electrically connected to the headlights 16. The second light sensor 25 activates the headlights 16 only upon detecting near darkness. An encasement 22 is provided wherein the first light sensor 24 and the second light sensor 25 are positioned within the encasement 22. The encasement 22 is secured to the vehicle 12 by at least one fastener 28 as shown in FIG. 3 of the drawings. A transparent cover 26 is preferably secured to the encasement 22 for protecting the light sensors 24, 25 from the elements of weather. A seal 29 is secured mesially the encasement 22 and the transparent cover 26 for preventing debris from accumulating within the encasement 22.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An auto light sensor system for controlling parking lights and headlights of a vehicle according to lighting conditions outside of said vehicle, comprising:

a light detecting means electrically connected to said parking lights and electrically connected to said headlights, wherein said light detecting means activates said parking lights only upon detecting slight to complete darkness and wherein said light detecting means activates said headlights upon detecting near darkness outside of said vehicle;

wherein said light detecting means comprises:

a first light sensor electrically connected to said parking lights, wherein said first light sensor activates said parking lights only upon detecting slight to complete darkness, and a second light sensor electrically connected to said headlights, wherein said second light sensor activates said headlights only upon detecting near darkness;

wherein said light detecting means further includes an encasement wherein said first light sensor and said second light sensor are adjacently positioned within said encasement;

wherein said encasement is separate from any housing containing said headlights and said parking lights and is secured to said vehicle separate from any said housing to minimize any detection of reflected light from said headlights by said first and second light sensors; and a transparent cover secured to said encasement.

2. The auto light sensor system of claim 1, wherein said light detecting means further includes a seal secured between said encasement and said transparent cover for preventing debris from accumulating within said encasement.

3. The auto light sensor system of claim 2, wherein said first light sensor and said second light sensor are electrically connected so as to prevent the switching of said parking lights and said headlights when a temporary bright light source passes by them, whereas both said first light sensor and said second light sensor need to receive a similar amount of light for a finite period of time before deactivating said headlights and said parking lights.

4. The auto light sensor system of claim 3, wherein said headlights cannot be manually switched off during darkness.

5. An auto light sensor system for illuminating the headlights and parking lights of a vehicle, the system comprising:

a first light sensor electrically connected to the headlights of the vehicle such that the headlights are illuminated when the first light sensor senses an ambient light level below a first pre-determined level;

a second light sensor electrically connected to the parking lights of the vehicle such that the parking lights are illuminated when the second light sensor senses an ambient light level below a second predetermined level;

wherein the first and second light sensors are positioned adjacent each other in a housing, said housing being adapted for attachment to surface of the vehicle;

a transparent cover removably connectable to said housing, the transparent cover being adapted for permitting ambient light to enter the housing for permitting said first and second light sensors to sense the level of ambient light.

6. The auto light sensor system of claim 5 wherein the cover includes a generally rectangular central face and four substantially planar side extensions disposed outwardly from the central face at an angle such that the cover forms a pyramidal frustum, the side extensions being for refracting ambient light from outside the housing inwardly towards the first and the second light sensors.

7. The auto light sensor of claim 6 wherein the side extensions include an outer perimeter edge for abutting the housing, the outer perimeter edge having a groove therein for receiving a seal such that contaminants are prevented from entering the housing.

8. The auto light sensor of claim 6 wherein the central face includes a pair of oppositely positioned apertures, each aperture being adapted to receive a screw;

wherein the housing includes a pair of screw receiving protrusions extending inwardly from an interior edge of the housing, the protrusions being alignable with the apertures in the central face such that the cover is removably attachable to the housing.

9. An auto light sensor system for illuminating the headlights and parking lights of a vehicle, the system comprising:

a first light sensor electrically connected to the headlights of the vehicle such that the headlights are illuminated when the first light sensor senses an ambient light level below a first pre-determined level;

a second light sensor electrically connected to the parking lights of the vehicle such that the parking lights are illuminated when the second light sensor senses an ambient light level below a second pre-determined level;

wherein the first and second light sensors are positioned adjacent each other in a housing, said housing being adapted for attachment to surface of the vehicle;

a transparent cover removably connectable to said housing, the transparent cover being adapted for permitting ambient light to enter the housing for permitting said first and second light sensors to sense the level of ambient light;

wherein the cover includes a generally rectangular central face and four substantially planar side extensions disposed outwardly from the central face at an angle such that the cover forms a pyramidal frustum, the side extensions being for refracting ambient light from outside the housing inwardly towards the first and the second light sensors;

wherein the side extensions include an outer perimeter edge for abutting the housing, the outer perimeter edge having a groove therein for receiving a seal such that contaminants are prevented from entering the housing;

wherein the central face includes a pair of oppositely positioned apertures, each aperture being adapted to receive a screw; and wherein the housing includes a pair of screw receiving protrusions extending inwardly from an interior edge of the housing, the protrusions being alignable with the apertures in the central face such that the cover is removably attachable to the housing.

* * * * *